(12) United States Patent
Werner

(10) Patent No.: US 6,641,147 B2
(45) Date of Patent: Nov. 4, 2003

(54) MODIFIED SHOPPING CART WITH LARGE ITEM CARRIER

(76) Inventor: Brent E. Werner, 6932 Ammons St., Arvada, CO (US) 80004

( * ) Notice: Subject to any disclaimer, the term of this patent is extended or adjusted under 35 U.S.C. 154(b) by 84 days.

(21) Appl. No.: 09/941,919

(22) Filed: Aug. 30, 2001

(65) Prior Publication Data
US 2003/0042694 A1 Mar. 6, 2003

(51) Int. Cl.[7] .................................................. B62B 3/00
(52) U.S. Cl. ........................ 280/33.991; 280/33.992; 280/47.35
(58) Field of Search ................. 280/33.991, 47.35, 280/33.995, 33.997, 33.992, 33.998, 47.19, 47.34, 33.993, 33.996, 638, 35, 651, 652, 79.6, 79.7; 40/590; 220/486, 505; 232/19; 248/99

(56) References Cited

U.S. PATENT DOCUMENTS

| | | | | |
|---|---|---|---|---|
| 5,401,042 A | * | 3/1995 | Ruger | 280/33.997 |
| 5,435,582 A | * | 7/1995 | Davidson | 280/33.992 |
| 5,507,507 A | * | 4/1996 | Davidson | 280/33.991 |
| 5,553,876 A | * | 9/1996 | Trubiano | 280/33.991 |
| 5,836,596 A | * | 11/1998 | Wanzl | 280/33.991 |
| 6,237,924 B1 | * | 5/2001 | Reiland et al. | 280/33.993 |
| 6,364,326 B1 | * | 4/2002 | Reiland et al. | 280/33.993 |
| 6,406,041 B1 | * | 6/2002 | Rea | 280/33.992 |
| 6,471,236 B1 | * | 10/2002 | Eskridge | 280/648 |
| 2002/0135145 A1 | * | 9/2002 | Saccani | 280/33.991 |
| 2003/0011152 A1 | * | 1/2003 | Teeten | 280/33.991 |

* cited by examiner

Primary Examiner—Brian L. Johnson
Assistant Examiner—J. Allen Shriver
(74) Attorney, Agent, or Firm—Edwin H. Crabtree; Ramon L. Pizarro; Donald W. Margolis

(57) ABSTRACT

A modified shopping cart for holding large, long and bulky items, such as building materials and the like, that will not fit inside the open top basket of a standard shopping cart or rest on top of the cart. The modified shopping cart includes a cart frame having a top, opposite sides and a bottom. On the bottom of the cart frame are mounted on a plurality of caster wheels. The cart frame also includes a frame platform for resting small items thereon. The shopping cart also includes an open top basket disposed above the frame platform. The basket is made of heavy gauge wire. The open top basket includes a first side, a second side, a front, a rear with handle and a bottom. The bottom of the basket is mounted on the top of the cart frame. In one embodiment of the invention, a large item carrier attached to the front of open top basket. The large item carrier includes a mounting plate with a pair of spaced apart horizontal carrier arms with openings therein. The openings are used for receiving items therethrough and holding the items next to the front of the basket. Also, the invention includes additional variations and modifications to the shopping cart for holding and transporting large, long and bulky items.

20 Claims, 3 Drawing Sheets

MODIFIED SHOPPING CART WITH LARGE ITEM CARRIER

BACKGROUND OF THE INVENTION (a) Field of the Invention

This invention relates to shopping carts used in various types of stores and more particularly, but not by way of limitation, to a modified shopping cart with large item carrier for holding different sizes and shapes of building materials and the like along with holding large, long and bulky items that typically won't fit inside or rest on top of a standard shopping cart.

(b) Discussion of Prior Art

Heretofore, there have been a variety of different types of shopping carts used for purchasing items in a store. For example, in U.S. Pat. No. 5,836,596 to Wanzl and U.S. Pat. No. 5,366,123 to Range, two shopping carts are described with detachable carriers for holding different types of store purchased items. In U.S. Pat. No. 4,376,502 to Cohen, a removable basket is illustrated which nests inside a shopping cart. In U.S. Pat. No. 5,362,077 to Adamson, a retractable cup holder is shown for mounting on a shopping cart. In U.S. Pat. No. 4,678,195 to Trubiano, a shopping cart is illustrated having a clothing hanger. In U.S. Pat. No. 6,056,178 to Rapp-Duncan, a cup holder and an auxiliary bin mounted on a shopping cart are described for mounting on a side of the shopping cart.

None of the above mentioned prior art shopping carts provide the unique features, structure, function and advantages of the subject invention for holding and carrying large, long and bulky items as described herein.

SUMMARY OF THE INVENTION

In view of the foregoing, it is a primary objective of the subject invention to modify an open top basket of a standard shopping cart for holding large and bulky items, such as building material and the like, that will not fit inside the open top basket of the shopping cart or rest on top of the cart.

Another object of the invention is the modified shopping cart can be adapted for holding an open top carrier. The carrier is used for holding the large and bulky items inside the cart basket, next to a side of the basket or in front of the cart basket.

Yet another object of the invention is the use of a standard shopping cart with an open top side carrier. The side carrier is adjustably mounted on the side of a cart frame. The side carrier can be folded from a vertical position into a horizontal position for holding large, long and bulky items next to the side of the cart.

The modified shopping cart includes a cart frame having a top, opposite sides and a bottom. On the bottom of the cart frame are mounted on a plurality of caster wheels. The cart frame also includes a frame platform for resting small items thereon. The shopping cart also includes an open top basket disposed above the frame platform. The basket is made of heavy gauge wire. The open top basket includes a first side, a second side, a front, a rear with handle and a bottom. The bottom of the basket is mounted on the top of the cart frame. In one embodiment of the invention, the first and second sides of the basket are shortened for receiving a portion of a rear of an open top carrier received against the front of the basket. A bottom of the carrier rests on a portion of the bottom of the cart frame. Also, the invention includes additional variations and modifications of the shopping cart and cart basket along with a foldable open top carrier attached to one side of the cart frame.

These and other objects of the present invention will become apparent to those familiar with different types of shopping carts and material handling equipment when reviewing the following detailed description, showing novel construction, combination, and elements as herein described, and more particularly defined by the claims, it being understood that changes in the embodiments to the herein disclosed invention are meant to be included as coming within the scope of the claims, except insofar as they may be precluded by the prior art.

BRIEF DESCRIPTION OF THE DRAWINGS

The accompanying drawings illustrate accompanying drawings complete preferred embodiments in the present invention according to the best modes presently devised for the practical application of the principles thereof, and in which.

DESCRIPTION OF THE PREFERRED EMBODIMENTS

Figure 1:
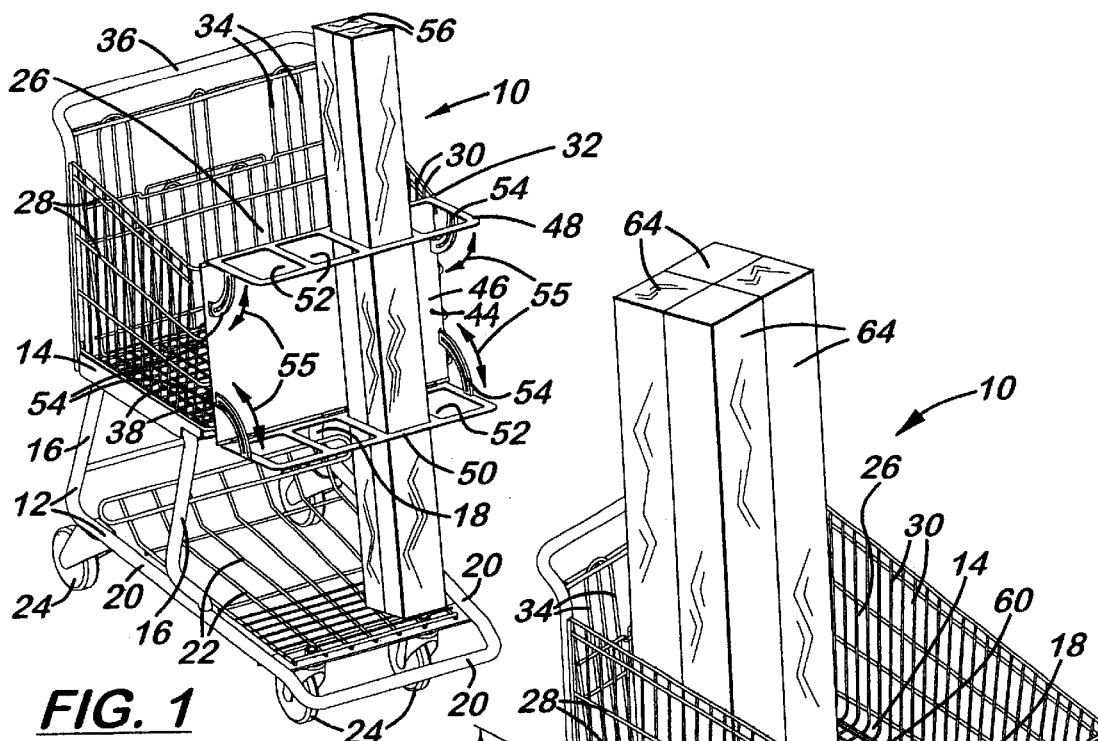
FIG. 1 is a perspective view of the subject modified shopping cart with a large item front foldable carrier mounted next to the front of a cart basket. The carrier is used for holding large, long and bulky items.

In FIG. 1, a perspective view of the subject modified shopping cart is shown having a general reference numeral 10. The modified shopping cart 10 includes a cart frame 12. The cart frame 12 includes top frame members 14, first side frame members 16, second side frame members 18, bottom frame members 20 and a frame platform 22 attached to the bottom frame members 20. The frame platform 22 is used for receiving small items thereon. Attached to the underside of the bottom frame members 20 are a plurality of caster wheels 24. Obviously, the caster wheels 24 are used for transporting the shopping cart 10 and various items carried thereon.

Figure 4:
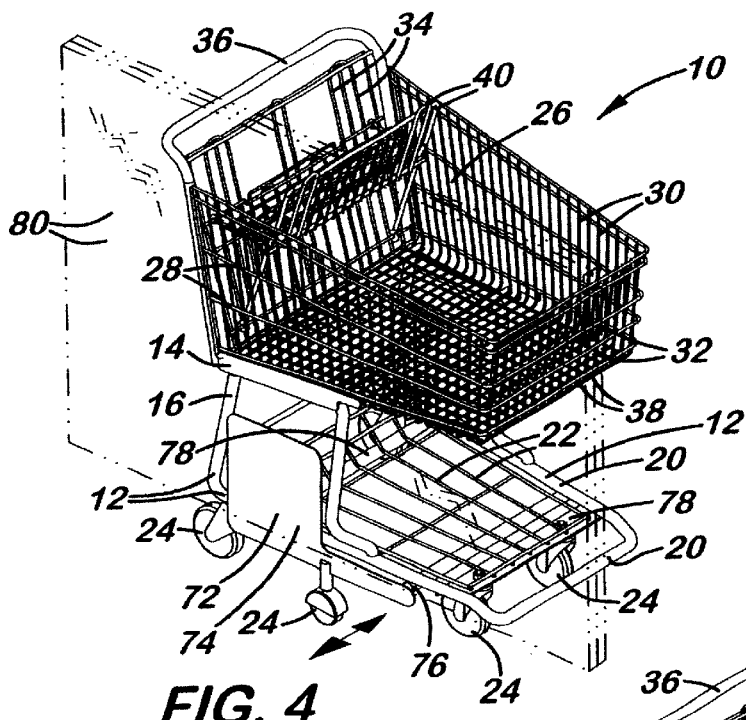
FIG. 4 is a perspective view of a standard shopping cart with an open top side carrier slidably attached to cross members in the bottom of the cart frame. The side carrier is shown holding two large sheets of plywood.
Figure 5:
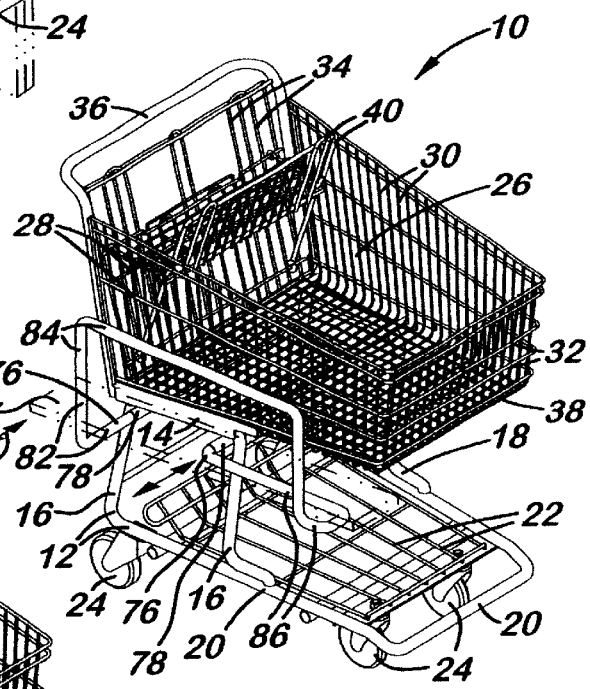
FIG. 5 is another perspective view of the shopping cart having a sliding side frame carrier slidably attached to cross members with a carry plate thereon. The cross members are attached to the top of the cart frame. The side frame carrier is similar to the open top side carrier shown in FIG. 4.
Figure 6:
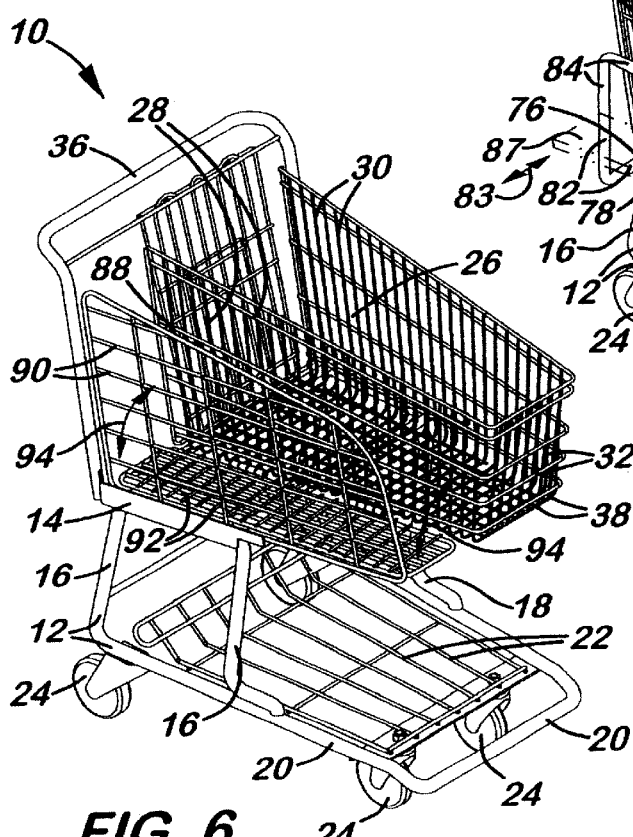
FIG. 6 is still another perspective view of the shopping cart with a reduced width in the front and rear of the open top basket and an opening next to the first side of the basket for receiving large, long and bulky items on a foldable bottom frame member hinged to the bottom of the basket.

The shopping cart 10 also includes an open top basket 26 disposed above the frame platform 22. The basket 26 is made of heavy gauge wire. The open top basket 26 includes a first side 28, a second side 30, a front 32, a rear 34 with a handle 36 and a bottom 38. The basket 26 also includes a foldable rack 40 attached to the rear 34 of the basket. The foldable rack 40 is shown in FIGS. 4–6. The bottom 38 of the basket 26 is mounted on the top frame members 14 of the cart frame 12.

In one embodiment of the invention as shown in FIG. 1, the front of the basket 26 is used for receiving a portion of a flat mounting plate 44 of a large item foldable carrier 46. The foldable carrier 46 includes an upper carrier arm 48 and a lower carrier arm 50. The upper and lower carrier arms 48 and 50 include a plurality of carrier arm openings 52 for receiving various types of large, long and bulky items therethrough. The carrier arms 48 and 50 can include hinges 54 for folding the arms, as indicated by arrows 55, against the mounting plate 44 when the carrier 46 is not in use. Also, the carrier arms if desired can be stationary in an upwardly extending position. In this example, the carrier 46 is shown holding a pair of 2×4 inch dimensional lumber 56. The lower ends of the lumber 56 are shown resting on a portion of the frame platform 22, which includes additional metal wire webbing for adding strength to the front of the platform for receiving heavy items thereon. While not shown in the FIG. 1, the flat mounting plate 44 can be used for placing store advertising, logos, etc., thereon.

Figure 2:
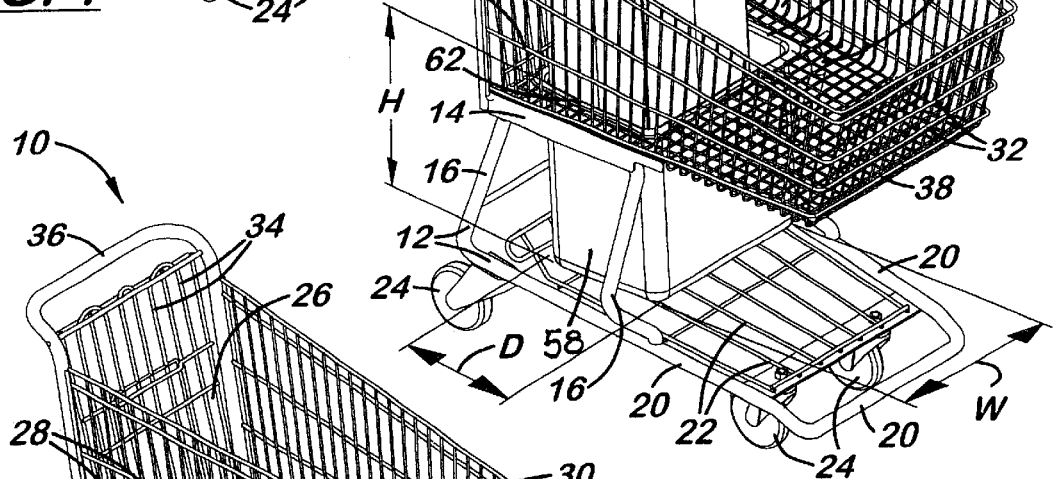
FIG. 2 is another perspective view of the modified shopping cart with an open top carrier mounted on a frame platform. An open top of the carrier is indexed with an opening in the bottom of the cart basket.

In FIG. 2, another perspective view of the modified shopping cart 10 is shown. The cart 10, in this example, includes a smaller carrier 58 with an open top 60. The smaller carrier 58 is received on top of the frame platform 22. The open top 60 of the carrier 58 is indexed with an opening 62 in the bottom 38 of the cart basket 26. In this drawing, four wooden fence posts 64 are shown received inside the cart basket 26 with the lower end of the posts 64 resting inside the carrier 58. A portion of the first side 28 of the basket 26 has been cut away to show the bottom of the posts 64 received inside the carrier 58. The smaller carrier 58 may have a width "W", a depth "D" and a height "H". The width "W" may be in a range of 12 to 36 inches, the depth "D" may be in a range of 12 to 18 inches and the height "H" in a range of 12 to 18 inches.

Figure 3:
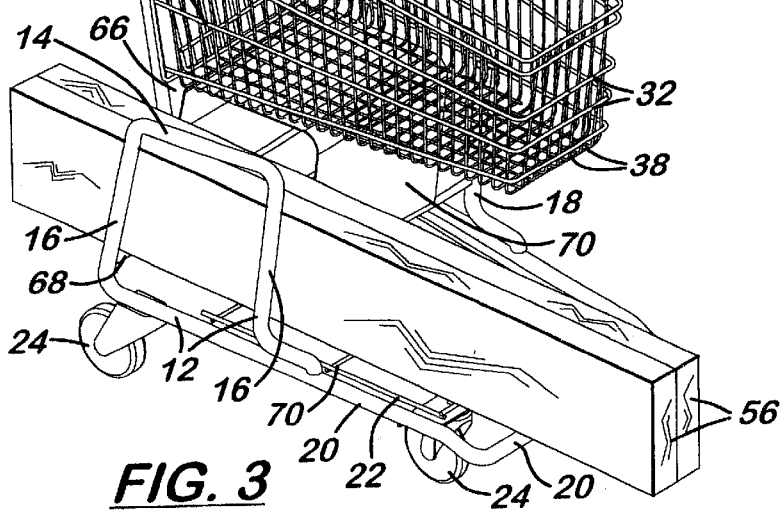
FIG. 3 is still another perspective view of the shopping cart with a width of the front and rear of the open top basket reduced for leaving an opening or space above the top of the cart frame for receiving large, long and bulky items resting on the frame.

In FIG. 3, another perspective view of the shopping cart 10 is illustrated. In this example, the width of the front 32 and the rear 34 of the open top basket 26 has been reduced for leaving an opening 66 or space in the top frame members 14 and between the first side 28 of the open top basket 26 and the first side members 16 of the cart frame 12. The cart frame 12 includes two cross members 68 and 70 attached to the first and second side frame members 16. The cross members 68 and 70 and the front of the bottom frame member 20 are used for receiving large items thereon. In this drawing, a pair of 2×8 or 2×10 inch pieces of lumber 56 are received through the opening 66 and are carried on top of the cross members 68 and 70 and the bottom frame member 20.

In FIG. 4, a perspective view of a standard shopping cart 10 is shown. In this embodiment of the invention, the cart 10 includes a large item sliding side carrier 72. The sliding side carrier 72 includes a carrier panel 74 and a pair of carrier arms 76. The carrier arms 76 are slidably received in a pair of cross members 78. The cross members 78 are attached to the bottom 20 of the cart frame 12. By sliding the arms 76 inside the cross members 78, an opening between the side of the carrier panel 74 and the first side frame members 16 and the first side 28 of the basket 26 can be adjusted for receiving large items therebetween. The side carrier 72 is shown holding two large sheets of plywood 80, shown in dashed lines, resting on top of the carrier arms 76 and next to the first 28 of the open top basket 26. The side carrier 72 can also include a caster wheel 24 attached to the bottom of the carrier panel 74 for added support.

In FIG. 5, another perspective view of the shopping cart 10 is shown. The shopping cart, in this example, includes a large item sliding side frame carrier 82. The side frame carrier 82 is similar to the sliding side carrier 72 shown in FIG. 4, but includes cross members 78 attached to the top 14 of the cart frame 12. The carrier 82 includes carrier arms 76 slidably received in the cross members 78. An end of the rear carrier arm 76 is attached to an inverted vertical "U" shaped frame member 84. The frame member 84 is used to hold large items next to the side of the first side 28 of the basket 26. An end of the front carrier arm 76 is attached to a horizontal "U" shaped frame member 86. The horizontal frame member 86 includes an end attached to one end of the vertical frame member 84. A transparent plastic or metal carrier plate 87 is mounted on the horizontal frame member 86 and the carrier arms 76 for receiving the bottom of large, long and bulky items thereon, when transported using the modified shopping cart 10 and holding the items higher on the cart when compared to the sliding side carrier shown in FIG. 4.

In FIG. 6, the shopping cart 10 is shown with the width of the front 32 and the rear 34 of the open top basket 26 reduced similar to the cart 10 shown in FIG. 3. In this example an opening 88 is provided between to the first side 28 of the open top basket 26 and a vertical side frame 90 attached to the top frame members 14 of the cart frame 12. At the bottom of the opening 88 is a horizontal foldable frame member 92, which is hinged to the bottom of the first side 28. The frame member 92 can be used to receive large, long and bulky items thereon. Also, the frame member 92 can be folded upwardly, as indicated by arrows 94, for placing large items on the top of a portion of the frame platform 22.

Figure 7:
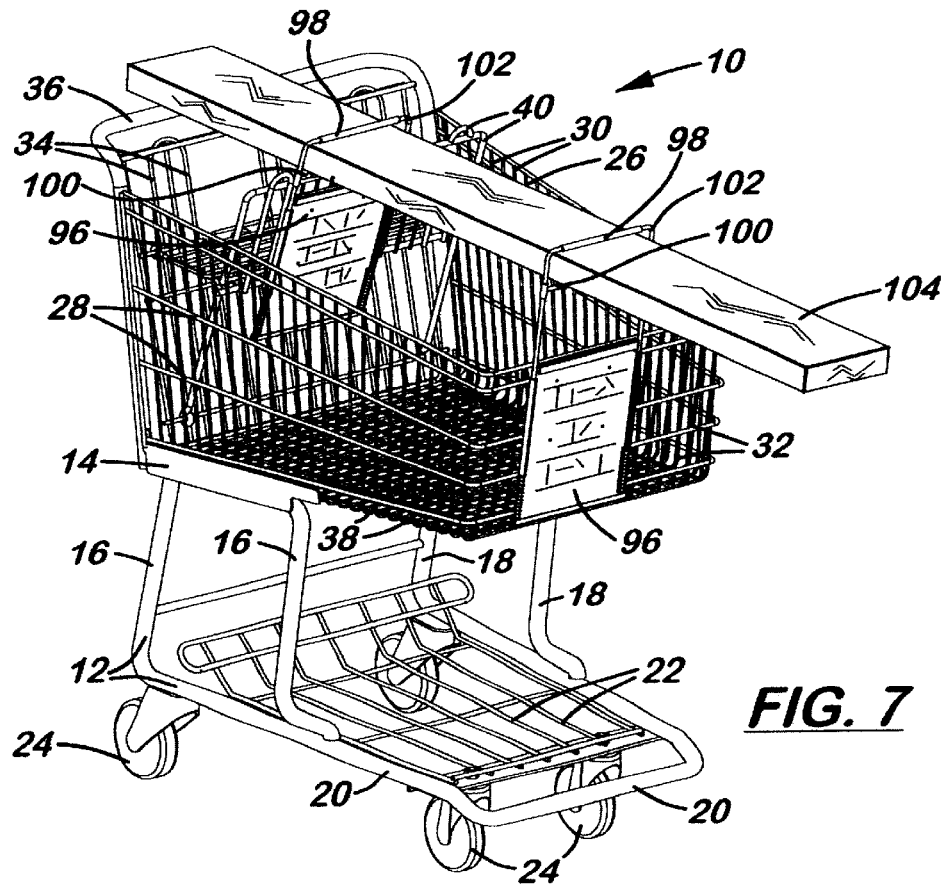
FIG. 7 is a perspective view of the modified shopping cart having slidably mounted inverted "U" shaped carriers attached to mounting plates. The mounting plates are attached to the front of the open top basket and the foldable rack.

In FIG. 7, the modified shopping cart 10 is shown with a pair of mounting plates 96 attached to a portion of the foldable rack 40 and the front 32 of the open top basket 26. As mentioned in FIG. 1, the mounting plates 96 can be used for placing store information, advertising, logos, etc., thereon. On opposite sides of the mounting plates 96 are slidably attached inverted "U" shaped carriers 98 with cross supports 100 attached to the sides of the carriers 98. An adjustable opening 102 is provided between the top of the carriers 98 and the cross supports 100 for receiving a large item therethrough. In this drawing the carriers 98 are shown holding a 2×10 inch piece of dimensional lumber 104. By adjusting the height of the carriers 98 on the mounting plates 96, the piece of lumber 104 can be held in a horizontal position to prevent is from sliding off of the top of the shopping cart 10. Also in this embodiment of the invention, it can be appreciated that bungy cords could be attached to the front and rear of the open top basket for securing and transporting the large, long and bulky items on the top of the cart 10.

Figure 8:
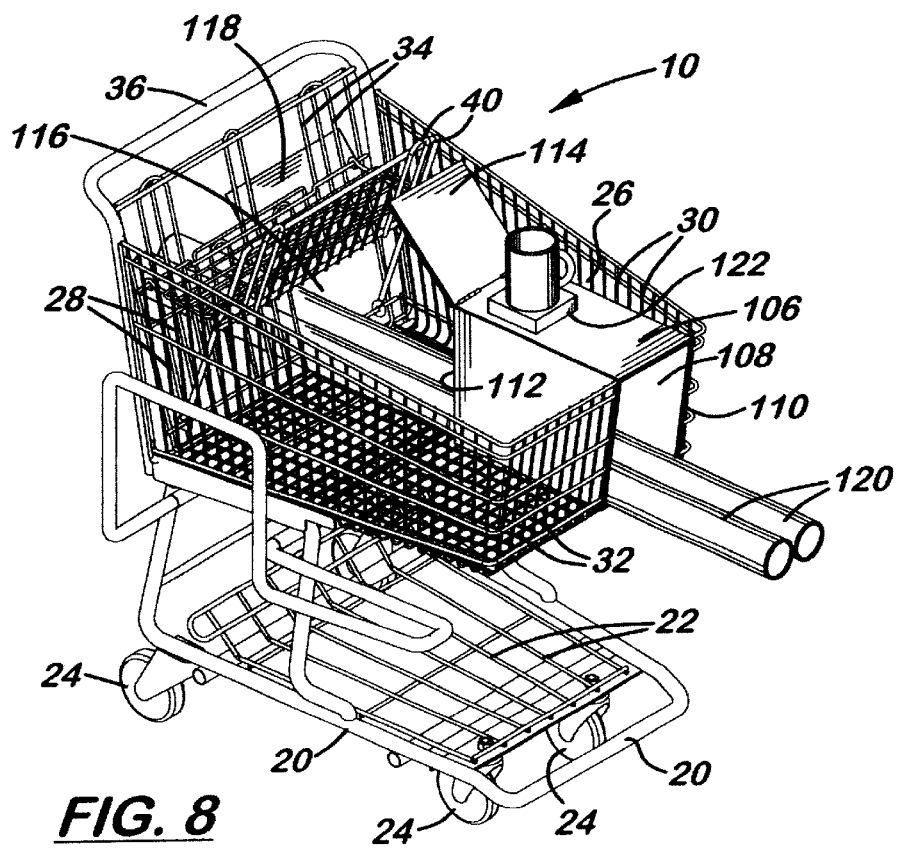
FIG. 8 is a perspective view of the shopping cart having a box carrier received inside the open top basket and indexed with openings in the front and rear of the basket. The box carrier is used for receiving large, long and bulky items therethrough and holding the items on the shopping cart.

In FIG. 8, still another embodiment of the modified shopping cart 10 is illustrated. In this drawing, a portion of the front 32 of the basket 26 has been cut away to illustrate a horizontal angular shaped large item carrier box 106 having a front opening 108 indexed with a front basket opening 110 in the front 32 of the basket 26. The carrier box 106 also has a rear opening 112 with a hinged lid 114. The rear 34 of the basket 26 also includes a rear basket opening 116 with a hinged lid 118. The two hinged lids 114 and 118 are biased in a closed position to prevent small items stored inside the basket 26 from dropping out of the rear of the basket or getting lost inside the box carrier 106.

In this drawing, a pair of large diameter pipes 120 are shown being received through the box carrier 106 with the lids 114 and 118 in a raised position. A portion of the two pipes 120 are shown extending outwardly from the front and rear of the shopping cart 10. The sides and top of the box carrier 106 can be used for advertising and logos and also used for setting or mounting one or more cup holders 122 thereon for the convenience of customers using the modified shopping cart 10.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which as exclusive privilege and property right is claimed are defined as follows:

1. A modified shopping cart for holding and carrying large, long and bulky items thereon, the shopping cart comprising:
   a cart frame having a top, opposite sides and a bottom, the bottom of said cart frame mounted on a plurality of caster wheels;
   an open top basket mounted on top of said cart frame, said open top basket having a first side, a second side, a front, a rear with handle and a bottom; and
   a pair of mounting plates with slidably attached inverted "U" shaped carriers attached thereto, said mounting plates attached to the front and rear of said open top basket, said "U" shaped carriers used for receiving large, long and bulky items therethrough.

2. The shopping cart as described in claim 1 further including a carrier arm mounting plate attached to the front of said open top basket, said mounting plate having a pair of spaced apart carrier arms openings therethrough for receiving large, long and bulky items with the bottoms of the items resting on a portion of said cart frame.

3. The shopping cart as described in claim 2 wherein said carrier arms include hinges for folding said carrier arms on said carrier arm mounting plate.

4. The shopping cart as described in claim 1 further including a box carrier disposed inside said open top basket, an opening in the front of said box carrier indexed with an opening in the front of said basket, an opening in the rear of the box carrier indexed with an opening in the rear of said basket, the openings in the front and rear of said basket used for inserting large, long and bulky items through said box carrier.

5. The shopping cart as described in claim 1 further including an open top carrier mounted on the bottom of said cart frame and disposed under the bottom of said open top basket, an open top of said carrier is indexed with an opening in the bottom of said basket.

6. The shopping cart as described in claim 1 further including an open top side carrier with an opening disposed next to the first side of said open top basket for receiving large, long and bulky items on top a portion of said cart frame.

7. A modified shopping cart for holding and carrying large and bulky items thereon, the shopping cart comprising:
   a cart frame having a top, opposite sides, a bottom and a frame platform, the bottom of said cart frame mounted on a plurality of caster wheels;
   an open top basket mounted on top of said cart frame, said open top basket having a first side, a second side, a front, a rear with handle and a bottom; and
   a box carrier disposed inside said open top basket, an opening in a front of said box carrier indexed with an opening in the front of said basket, an opening in the rear of the box carrier indexed with an opening in the rear of said basket, the openings in the front and rear of said basket used for inserting large, long and bulky items through said box carrier.

8. The shopping cart as described in claim 7 further including a carrier arm mounting plate attached to the front of said open top basket, said carrier arm mounting plate having an upper carrier arm with openings and a lower carrier arm with openings, the openings in said upper and lower carrier arms for receiving large, long and bulky items therethrough with the bottom of the items resting on a portion of said cart frame.

9. The shopping cart as described in claim 7 further including an open top side carrier having a carrier panel and a pair of carrier arms, said carrier arms slidably mounted on said cart frame for adjusting the distance between the first side of said basket and said carrier panel.

10. The shopping cart as described in claim 9 wherein said carrier arms are slidably received in a pair of cross members, said cross members attached to the bottom of said cart frame.

11. The shopping cart as described in claim 9 wherein said carrier arms are slidably received in a pair of cross members, said cross members attached to the top of said cart frame.

12. The shopping cart as described in claim 7 further including an open top carrier mounted on the bottom of said cart frame and disposed under the bottom of said open top basket, an open top of said carrier is indexed with an opening in the bottom of said basket.

13. The shopping cart as described in claim 7 further including an open top side carrier with an opening disposed next to the first side of said open top basket for receiving large, long and bulky items on top a portion of said cart frame.

14. A modified shopping cart for holding and carrying large and bulky items thereon, the shopping cart comprising:
   a cart frame having a top, opposite sides, a bottom and a frame platform, the bottom of said cart frame mounted on a plurality of caster wheels;
   an open top basket mounted on top of said cart frames said open top basket having a first side, a second side, a front, a rear with handle and a bottom; and
   an open top side carrier having a carrier panel and a pair of carrier arms, said carrier arms slidably mounted on said cart frame for adjusting the distance between the first side of said basket and said carrier panel.

15. The shopping cart as described in claim 14 wherein said carrier arms are slidably received in a pair of cross members, said cross members attached to the bottom of said cart frame.

16. The shopping cart as described in claim 14 wherein said carrier arms are slidably received in a pair of cross members, said cross members attached to the top of said cart frame.

17. The shopping cart as described in claim 14 further including a carrier arm mounting plate attached to the front of said open top basket, said mounting plate having a pair of spaced apart mounting plate carrier arms with openings therethrough for receiving large, long and bulky items with the bottoms of the items resting on a portion of said cart frame.

18. The shopping cart as described in claim 17 wherein said mounting plate carrier arms include hinges for folding said mounting plate carrier arms on said carrier arm mounting plate.

19. The shopping cart as described in claim 14 further including an open top carrier mounted on the bottom of said cart frame and disposed under the bottom of said open top basket, an open top of said carrier is indexed with an opening in the bottom of said basket.

20. The shopping cart as described in claim 14 further including a box carrier disposed inside said open top basket, an opening in the front of said box carrier indexed with an opening in the front of said basket, an opening in the rear of the box carrier indexed with an opening in the rear of said basket, the openings in the front and rear of said basket used for inserting large, long and bulky items through said box carrier.

\* \* \* \* \*